No. 815,321. PATENTED MAR. 13, 1906.
A. E. KEITH & J. & C. J. ERICKSON.
AUTOMATIC TELEPHONE SELECTOR SWITCH.
APPLICATION FILED MAY 2, 1905.
8 SHEETS—SHEET 7.
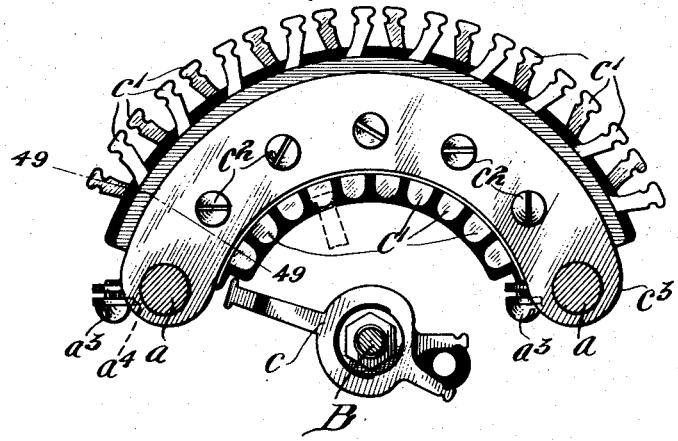
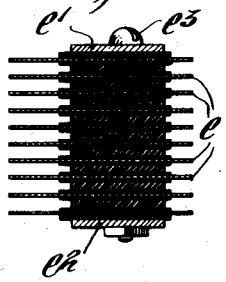
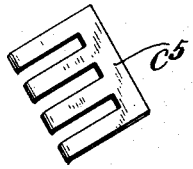
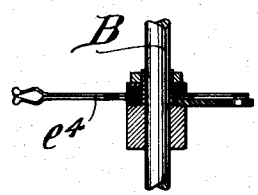
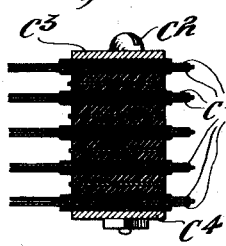
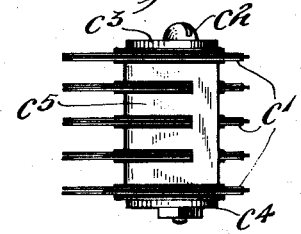
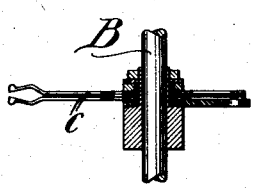
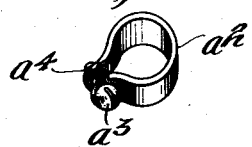
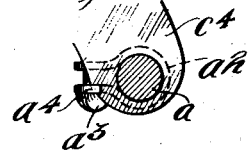
Witnesses.
R. H. Burfiend
A. Andersen.
Inventors:
Alexander E. Keith,
John Erickson and
Charles J. Erickson
By Bulkley & Durand
Attorneys.

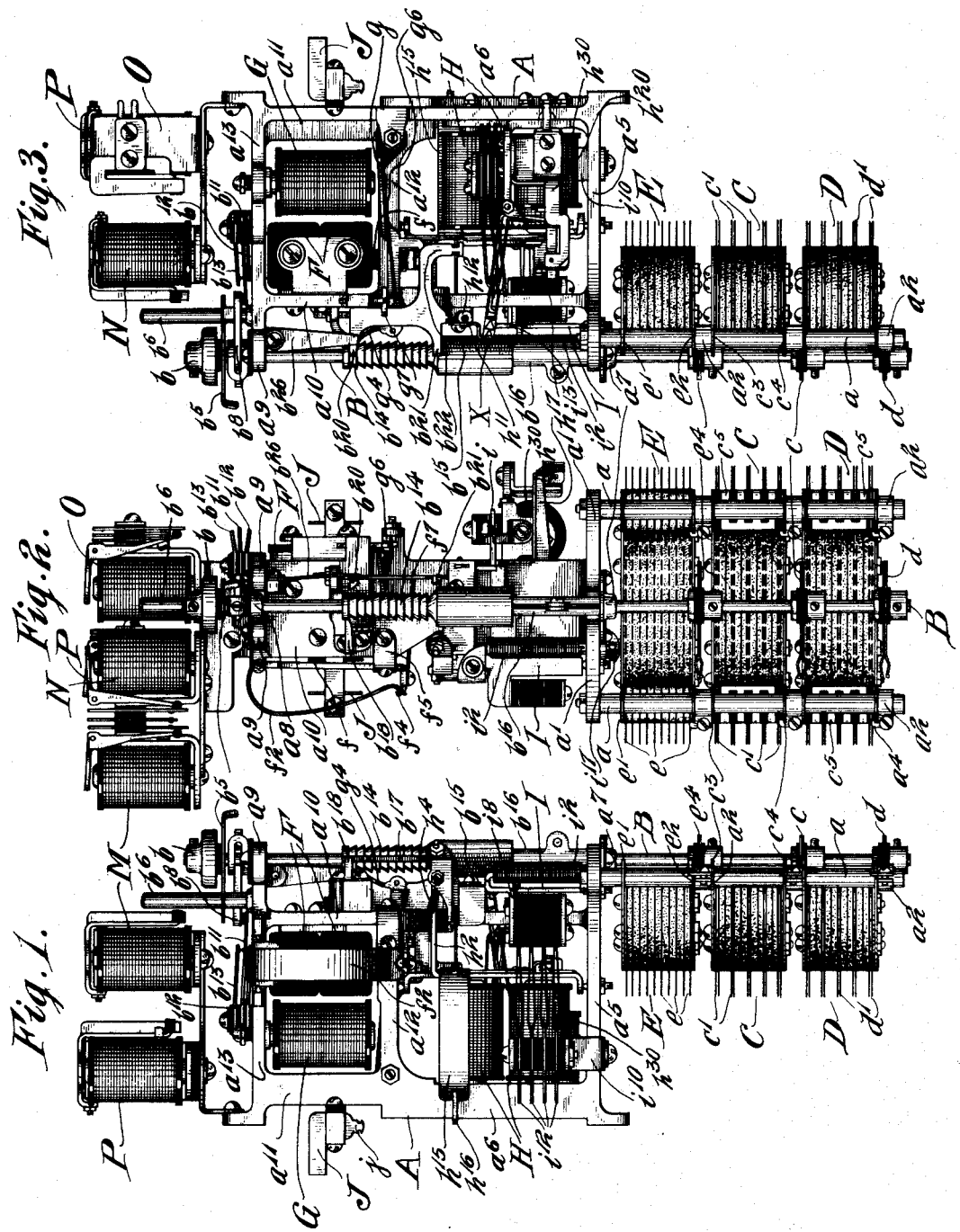

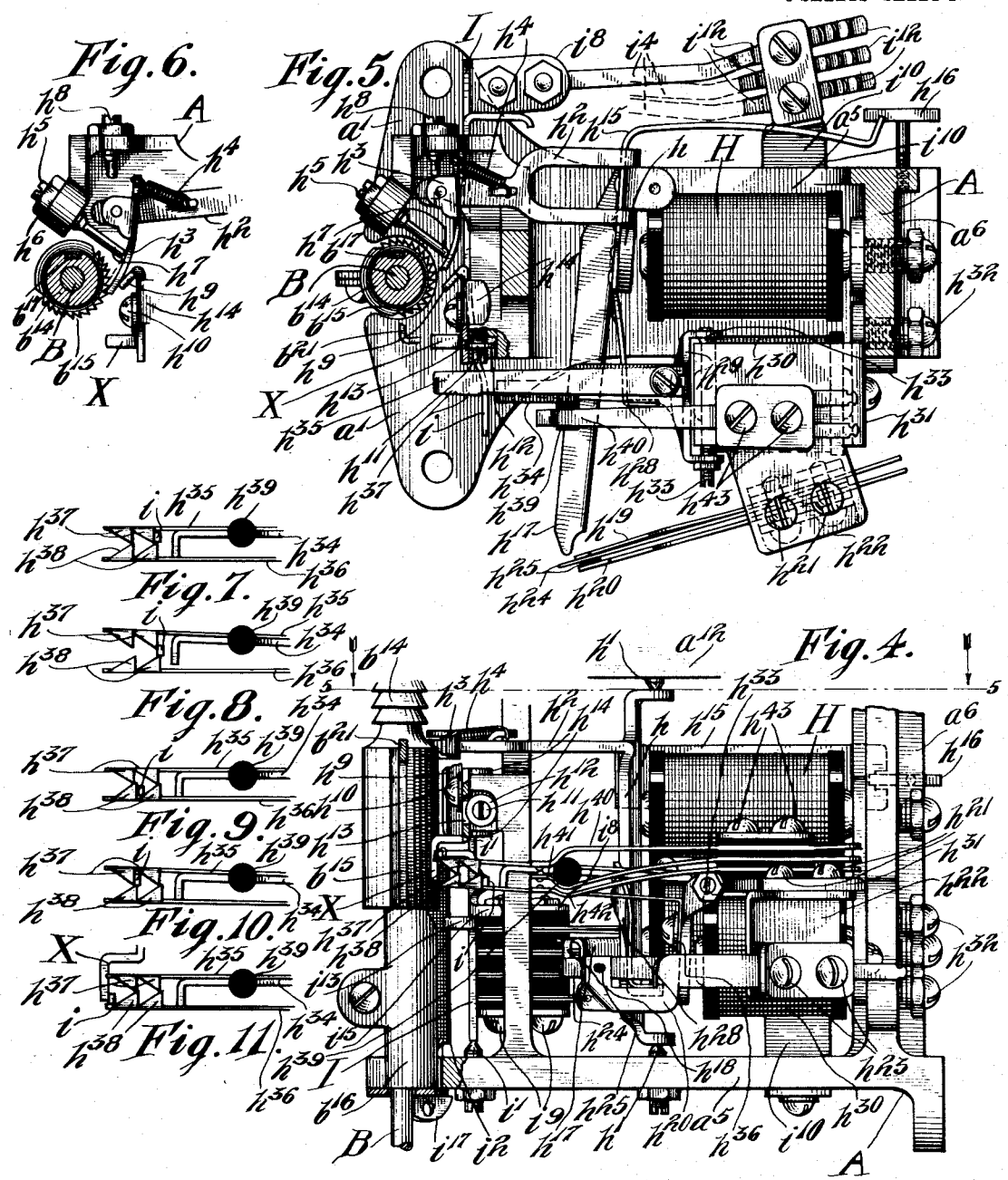

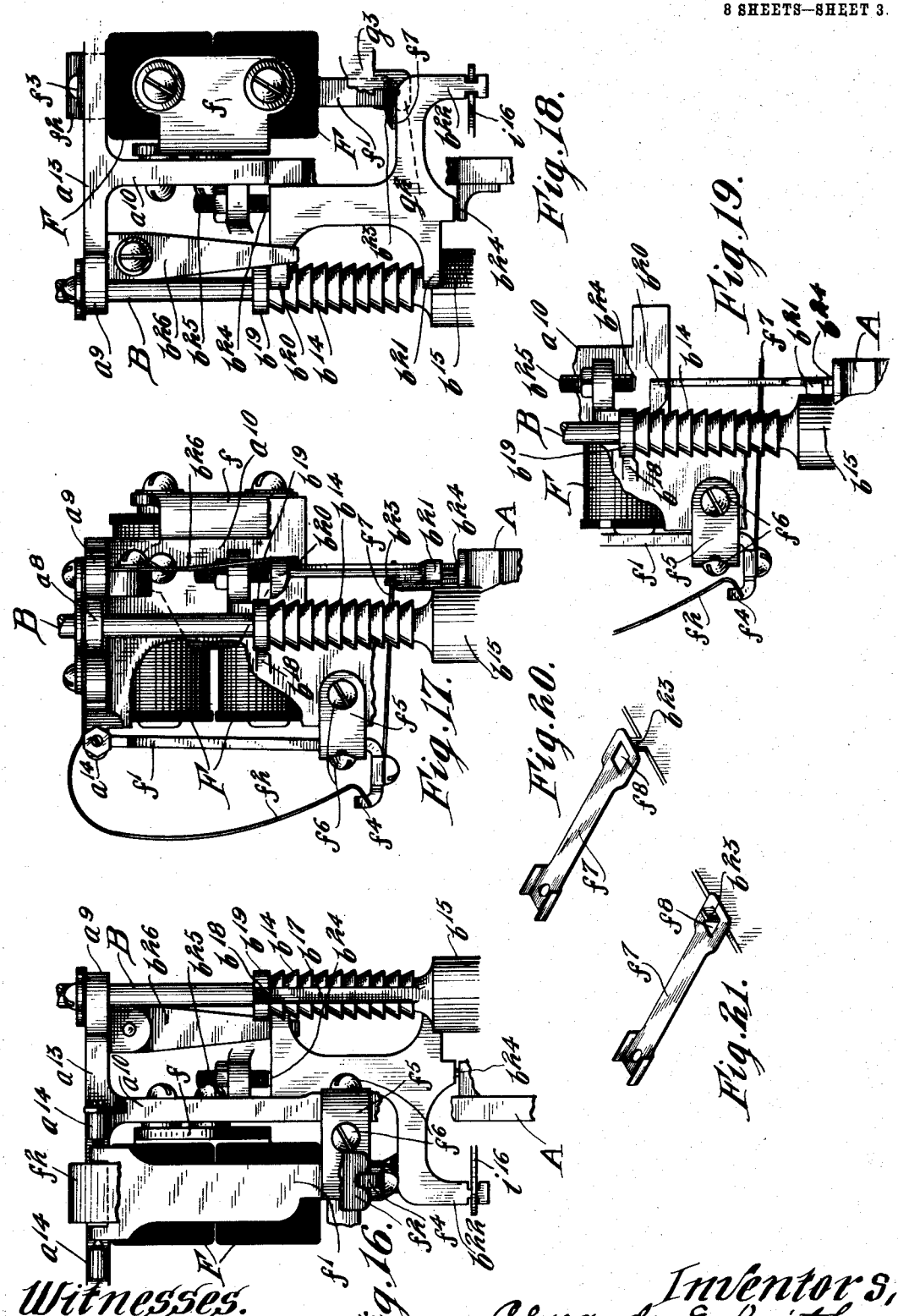

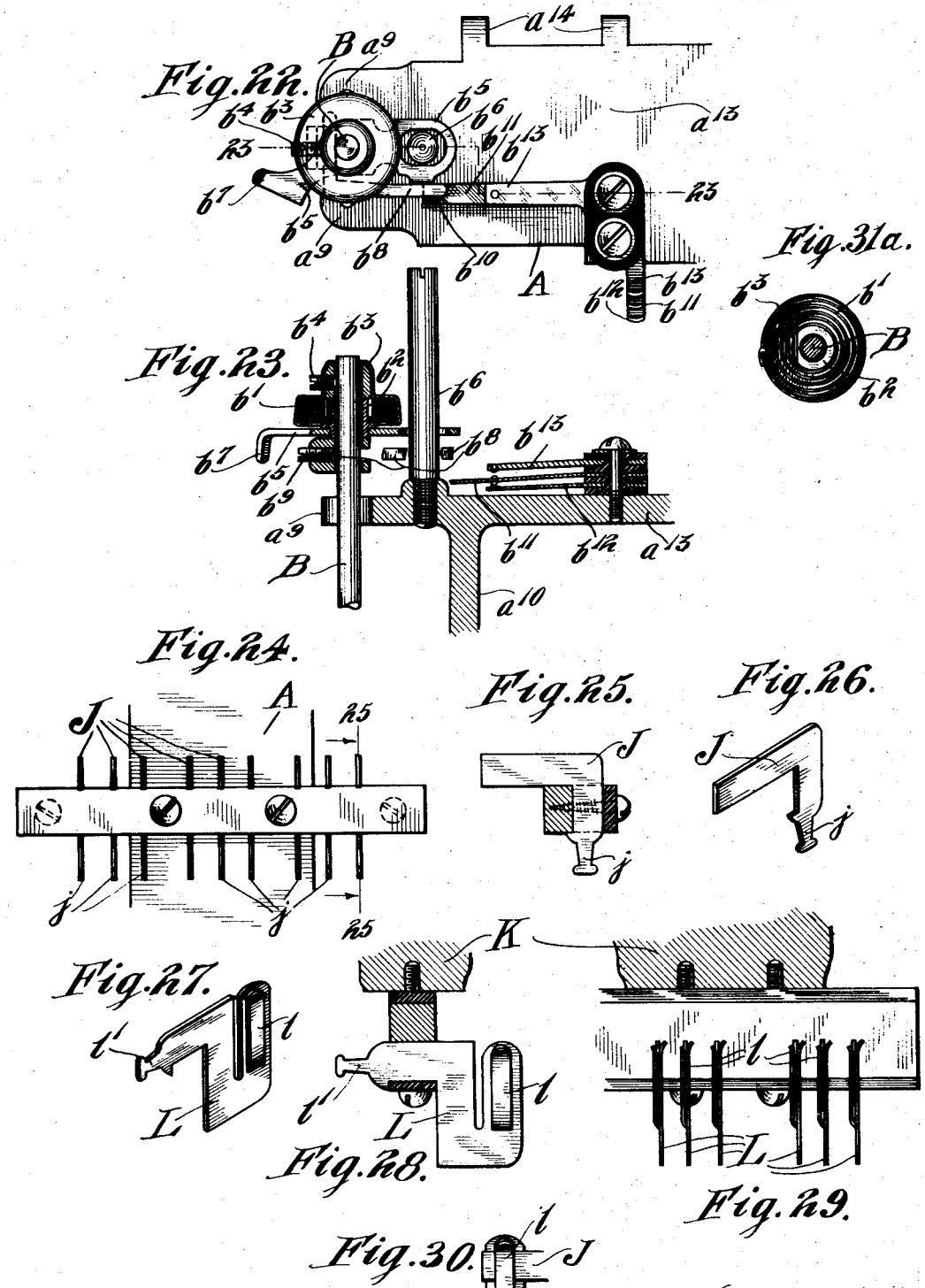

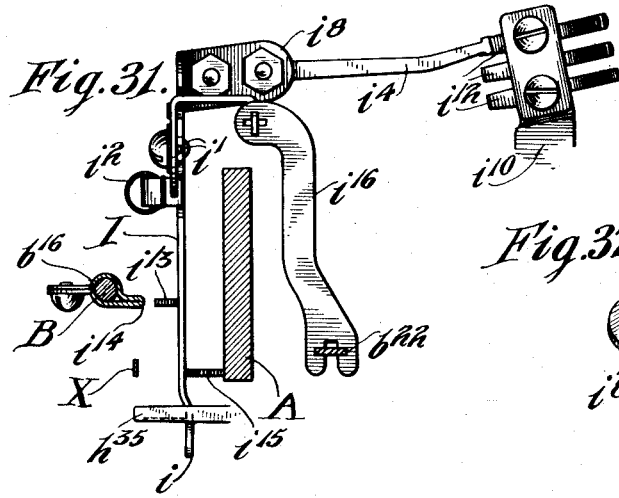

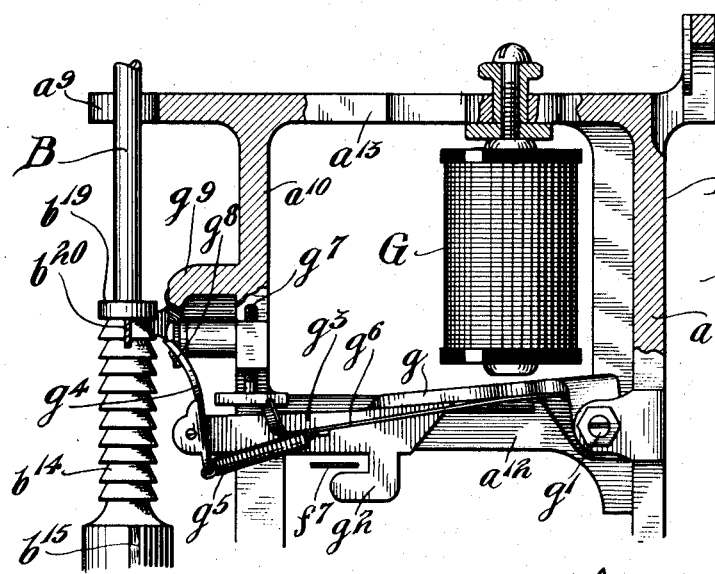
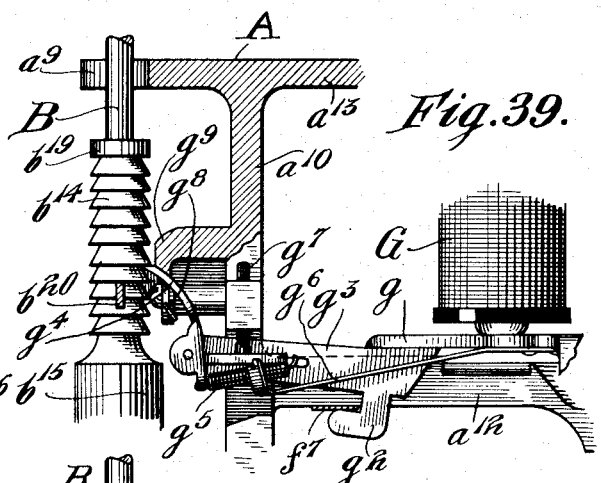
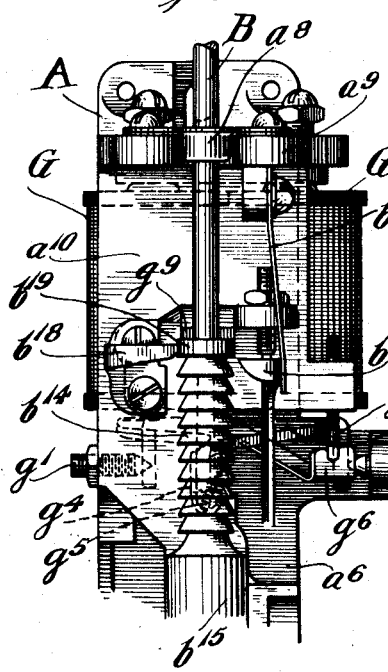
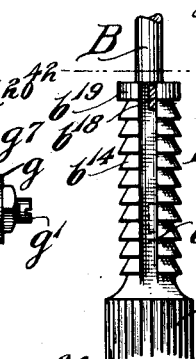
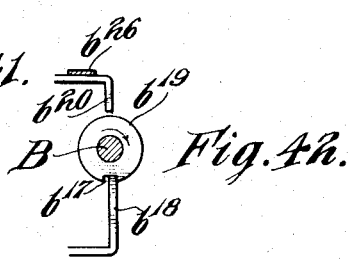
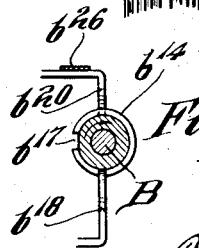

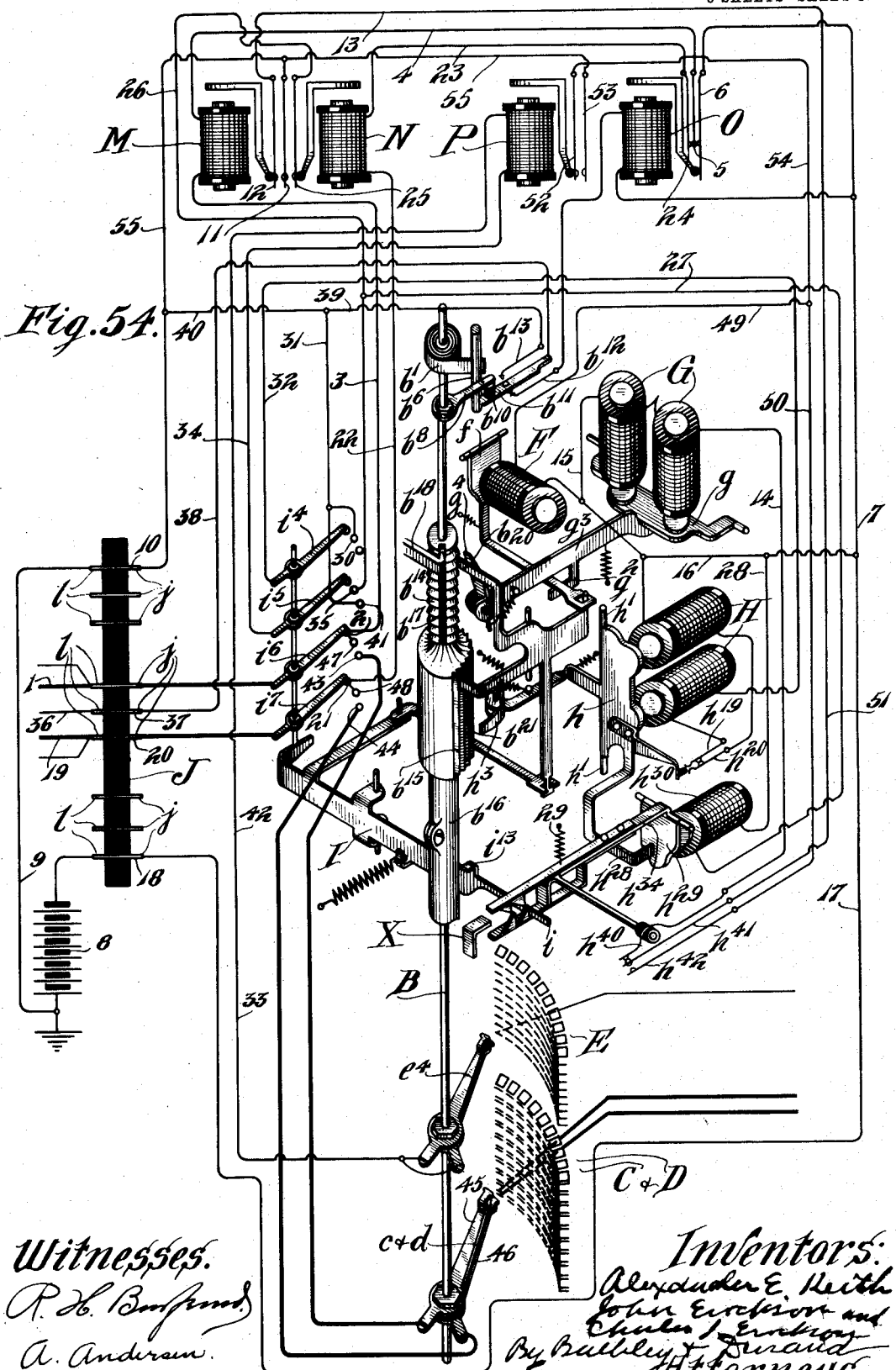

UNITED STATES PATENT OFFICE.

ALEXANDER E. KEITH, JOHN ERICKSON, AND CHARLES J. ERICKSON, OF CHICAGO, ILLINOIS, ASSIGNORS TO AUTOMATIC ELECTRIC COMPANY, OF CHICAGO, ILLINOIS, A CORPORATION OF ILLINOIS.

AUTOMATIC TELEPHONE SELECTOR-SWITCH.

No. 815,321.      Specification of Letters Patent.      Patented March 13, 1906.

Application filed May 2, 1905. Serial No. 258,509.

*To all whom it may concern:*

Be it known that we, ALEXANDER E. KEITH, JOHN ERICKSON, and CHARLES J. ERICKSON, citizens of the United States of America, and residents of Chicago, Cook county, Illinois, have invented a certain new and useful Improvement in Automatic Telephone Selector-Switches, of which the following is a specification.

Our invention relates to the automatic step-by-step switching apparatus or machinery employed in automatic telephone-exchanges.

It relates more particularly to that type of automatic switch or switching machine commonly known as a "selector"—that is to say, a switch employed for automatically selecting and making connection with an idle trunk-line leading to another selector or to a "connector," as the case may be. In some instances these selectors are known as "first selectors" and are so designated when they are employed to receive the electrical impulse or impulses representing the first digit of any subscriber's number. Again, these selectors are known as "second selectors" and when so referred to are employed for receiving the electrical impulse or impulses representing the second digit of any subscriber's number. Should the exchange be of considerable size—say one in which the subscribers' numbers range as high as five digits—some of these "selector-switches" would be known as "third selectors," inasmuch as they receive the electrical impulse or impulses representing the third digit of any subscriber's number. It is evident that the mechanism of our improved selector-switch is applicable to either first, second, or third selectors or fourth or fifth selectors, according to the size of the exchange. As will hereinafter more fully appear, certain features of our improved automatic switching device are also applicable to switches of the same general type, but which are for certain well-known reasons referred to as "connectors"—that is to say, switches which respond to the electrical impulses representing the last two digits of any subscriber's number and which make the final connection directly with the called-subscriber's line.

As a selector or even as a connector it will be seen that the essential feature consists of a rotatable and endwise-movable switch-shaft, together with switch arms or wipers mounted upon said shaft and adapted to engage the usual semicircular banks of contacts.

The machine or switch as a whole involves suitable electromagnetically-actuated mechanism for stepping the shaft vertically to any desired level of the bank-contacts, it being understood that these contacts are arranged in rows one above the other. The step-by-step or ratchet mechanism with which the switch is provided can also be employed for rotating the shaft in a step-by-step manner at any desired level; but, as will hereinafter more fully appear, this rotary step-by-step motion of the shaft is, when the switch is used as a selector, automatic in character and is not under the control of the calling subscriber. In such case, however, the calling subscriber has control of the step-by-step mechanism to the extent necessary to enable him to cause the said shaft to move or step up to any desired level, according to the character of the first digit of the called number; but as explained and after the calling subscriber has caused the selector to bring its shaft-wipers up to the desired level—that is to say, up to the desired row of contacts—the switch then continues its operation automatically and without the direct control of the subscriber for the purpose of automatically selecting an idle trunk-line leading to another selector or to a connector or to some other device, according to the size and character of the exchange. Obviously the electromagnetically-actuated switch or mechanism of the machine must include means for insuring the desired mode of operation of the switch— as, for example, when employed by a calling subscriber in automatically selecting an idle trunk-line leading to the desired group of second selectors, third selectors, or connectors, as the case may be; but it will also be seen that provision must be made whereby the switch can be operated to the desired position and made to remain in such condition during conversation between two subscribers, but then released by some act on the part of one of the subscribers after the conversation is terminated. Again, when used as a selector the switch must in addition to its function of making connection with an idle trunk-line perform the further office of establishing such a guarding potential at all other terminals connected with such line as will preclude seizure thereof by some other subscriber, and, furthermore, and if employed as a first selector, provision must be made for creating such a guarding potential at all terminals at the calling-subscriber's line as will preclude a cutting in on this line by other subscribers while the same is in use. In other words, regardless of whether the switch is to be employed as a first, second, third, or other selector, means are desirably provided for enabling the switches to protect the lines in use against seizure by other subscribers when such lines are in use and in each case to protect the line leading from it and with which it has made connection against seizure by other subscribers. These and other desirable features or requirements will hereinafter more fully appear.

Generally stated, the object of our invention is the provision of an improved, simplified, and highly-efficient switching-machine of the foregoing general character.

Certain special objects are to provide, in combination with the other elements, the improved cast frame for mounting the operative parts of the switching mechanism; to provide, in combination with the other elements, improved flat adjustable springs for retaining the so-called "vertical" and "rotary" armatures of the so-called "vertical" and "rotary" magnets in their normal positions; to provide, in combination with the other elements, an improved flat spring and a novel arrangement for fastening the same in place for pressing the rigidly-connected locking-dogs against the so-called "vertical" and "rotary" ratchet-teeth carried by the rotary switch-shaft; to provide, in combination with the other elements, an improved arrangement involving a screw having a lock-nut and which passes through a lug in the frame and acts as a guide for the "rotary pawl"—that is, the pawl carried by the armature of the rotary magnet and which actuates the rotary ratchet-teeth carried by the shaft; to provide, in combination with the other elements, an improved stop for the said pawl of the so-called "rotary magnet;" to provide, in combination with the other elements, improved means for separating the banks of contacts and for holding the same in place and for insuring easy and effective adjustment thereof.

It is also an object, of course, to provide certain details and features of construction, improved combinations, and matters of improvement tending to increase the general efficiency and serviceability of an automatic step-by-step telephone-switching machine or mechanism of this particular character.

As previously stated and as will hereinafter more fully appear, many of the objects of our invention and many of the features of improvement are applicable to the so-called "connectors," as well as to a selector such as herein shown and described.

To the foregoing and other useful ends, however, our invention consists in matters hereinafter set forth and claimed.

In the accompanying drawings, Figures 1, 2, and 3 are respectively a left-hand side elevation, a front elevation, and a right-hand elevation of an automatic step-by-step switching-machine embodying the principles of our invention, the said switch in this instance being what is commonly known as a "selector." Fig. 4 is an enlarged side elevation of a portion of the mechanism shown in Fig. 3. Fig. 5 is a horizontal section on line 5 5 in Fig. 4. Fig. 6 is a detail of a portion of the mechanism shown in Fig. 5, showing the rotary pawl in engagement with the rotary ratchet-teeth. Figs. 7, 8, 9, 10, and 11 are each a detail of the ratchet or escapement mechanism of the so-called "side switch" and illustrate different conditions or positions of the same. Figs. 12, 13, 14, and 15 are each a detail of the end of the interrupter-arm and of the switch-springs operated thereby and show different conditions or positions of the same. Fig. 16 is a detail side elevation of a portion of the vertical step-by-step mechanism and shows the releasing devices and the rigidly-connected locking-dogs. Fig. 17 is a front view of the devices shown in Fig. 16. Fig. 18 is a view of the other side of the devices shown in Fig. 16. Fig. 19 is a view of a portion of the mechanism shown in Fig. 17, but showing the same in a different position. Figs. 20 and 21 are each a perspective of the link employed for connecting the armature of the "release-magnet" with the two rigidly-connected locking-dogs and show the said link in different positions relatively to the small projection on the double locking-dog which it is adapted to engage. Fig. 22 is a detail plan of the so-called "normal-post switch" and the clock-spring device for returning the shaft to its normal position. Fig. 23 is a detail vertical section on line 23 23 in Fig. 22. Fig. 24 is a back view of the jack-springs which are attached to the switch structure and which are adapted to engage the stationary jack-springs secured to the rack or other support upon which the switches are mounted. Fig. 25 is a section on line 25 25 in Fig. 24. Fig. 26 is a perspective of one of said jack-springs. Fig. 27 is a perspective of one of the stationary jack-springs—that is, one of the jack-springs secured to the rack or support on which the switches are mounted. Fig. 28 is a side view of the jack-spring shown in Fig. 27, showing its support in section. Fig. 29 is a face view of the structure shown in Fig. 28. Fig. 30 is a detail view showing the manner in which a jack-spring on the rack or support receives one of the jack-springs on the structure of the switch. Fig. 31 is a detail plan of the so-called "side switch," showing certain parts in horizontal section. Fig. 31ª is a detail view of the clock-spring device. Fig. 32 is a view similar to Fig. 31, but showing the side switch in second position. Fig. 33 shows the side switch in third position. Fig. 34 is a bottom plan of the side switch as shown in Fig. 31, showing a portion of the supporting - frame. Fig. 35 is a side view of the side-switch arms or wipers and the stationary contacts for the same. Fig. 36 is a detail view showing the key or device to which the lower end of the "side-switch spring" is secured and by which the tension of the latter is regulated. Fig. 37 is a perspective of the said side switch, showing the "side - switch wipers" and contacts removed. Fig. 38 is a detail view of the vertical step-by-step mechanism, showing adjacent parts in section. Fig. 39 is a view similar to Fig. 38, but showing the parts in a different position. Fig. 40 is a front view of the vertical step-by-step mechanism and adjacent parts. Fig. 41 is a side view of the vertical ratchet-teeth, showing the vertical groove or channel in same. Fig. 42 is a horizontal section on line 42 42 in Fig. 41. Fig. 43 is a detail section of the circular teeth shown in Fig. 41, showing the supporting - dog in engagement with the said teeth. Fig. 44 is a plan view of one of the line-contact banks, showing the switch-shaft and the bank-supporting rods in horizontal section and one of the shaft-wipers in its normal position. Fig. 45 is a vertical section through the so-called "private-bank contact." Fig. 46 is a perspective of one of the end pieces of the bank shown in Fig. 44. Fig. 47 is a detail sectional view of the "private-shaft wiper." Fig. 48 is a similar view of one of the line-shaft wipers. Fig. 49 is a vertical section on line 49 49 in Fig. 44. Fig. 50 is an end view of one of the "line-banks." Fig. 51 is a perspective of one of the rings or collars for supporting and separating the contact-banks. Fig. 52 is a detail section of one of the bank - supporting rods, showing the application of the collar shown in Fig. 51. Fig. 53 is a view similar to Fig. 52 and illustrates the method of applying or adjusting the said ring into place. Fig. 54 illustrates one method of wiring or connecting the magnets and relays and switches, &c., shown in the preceding figures and shows the principal parts of the mechanism in perspective.

As thus illustrated, the switch is adapted for use as a selector—either first, second, or third, as the case may be—and comprises a cast frame A, adapted to support the rotatable and vertically-movable switch-shaft B and other operative parts in suitable positions. As previously explained, a switch of this character is designed for use as a medium by which a telephone subscriber may establish connection between his line and a trunk-line or between a trunk-line already connected with his line and another trunk-line, according as the switch is used as a first, second, or third selector. More strictly speaking, the switch for connecting a subscriber's line with any one of a number of trunk-lines or for connecting a trunk-line with any one of another group of trunk-lines comprises the upper and lower banks C and D of "line-contacts," together with the switch-arms or shaft-wipers $c$ and $d$, the latter being mounted upon said shaft. As illustrated, these two banks of contacts are semicircular in form, each comprising five superimposed semicircular rows of "line-terminals," which are suitably insulated from each other and each of which consists of a pair of contacts connected with opposite sides of a metallic trunk-line. These line-terminals $c'$ and $d'$ are of the character shown more clearly in Fig. 44, each terminal, as stated, consisting of two contacts suitably insulated from each other and provided at their rear or outer ends with terminals suitable for making solder or other wire connections, and in each case these contacts have their forward ends held in position to be engaged by one of the two pairs of "line-wipers" mounted on the said shaft. (See Figs. 44, 49, and 50.) The "line-shaft wipers" $c$ and $d$ are, as illustrated, mounted in pairs, the pair $c$ being allotted to the line-bank C and the pair $d$ to the line-bank D. The two line-banks thus provided really constitute one bank divided into two sections, inasmuch as the construction illustrated involves one hundred line-terminals arranged in ten superimposed semicircular rows of ten terminals each. Consequently, and in order to obtain compactness and avoid cross-talk and secure other advantages, the line-terminals connected with the one hundred trunk-lines leading from the switch are divided into two groups and each group constituting, as stated, a bank; but in the bank D the five superimposed rows of trunk - line terminals represent the first, third, fifth, seventh, and ninth levels of the switch, while the terminals of the bank C represent the second, fourth, sixth, eighth, and tenth levels, or the "zero-level," as the uppermost or last level is sometimes called, of the switching apparatus as a whole. In other words, the two pairs of shaft-wipers $c$ and $d$ are adapted to operate in ten distinct levels or horizontal planes, the relative arrangement of the said wipers and rows of terminals being such that when the lower pair $d$ of line-wipers is operating in the first level the upper pair $c$ is out of use and swinging around in a plane just below the row of terminals representing the second level of the switch with the first or lowermost horizontal row in the bank C. On the other hand, when the pair $c$ of line-shaft wipers is working in the said second level of terminals the lower pair $d$ is then out of use and moving in a horizontal plane between the first and second horizontal rows of terminals in the bank D—that is, between the rows of terminals representing the first and third levels of the switch. It will be readily understood that the shaft-wipers are insulated from the shaft and that the members of each pair are insulated from each other, and in use the upper members of the two pairs are connected together and represent one side of the "line-circuit," while the lower members of the two pairs are connected together and allotted to the other side or parallel limb of the circuit. In this way the switch is capable of establishing any one of substantially a hundred possible connections, as will hereinafter more fully appear. As shown, the said line-banks are supported by rods or hangers $a$, the latter being arranged vertically at each side of the switch-shaft B and having their upper ends rigidly secured to the lower portion $a'$ of the frame. The so-called "private bank" E is similar in general form and construction to the other banks, but contains ten horizontal rows of contacts instead of five, and as another distinction each horizontal row of contacts in this private bank is made up of ten terminals, each consisting of a single contact, as shown more clearly in Fig. 45. In this way each line-terminal has a corresponding terminal or contact in the private bank, the object and function of these private-bank contacts being hereinafter more fully described. Like the line-terminals in the line-banks, the private-bank contacts are all suitably insulated from each other, and in each case the contacts, with their interposed insulation, are clamped together by means of bolts and upper and lower clamping-plates. For example and as shown in Fig. 45 the private-bank contacts $e$, together with their interposed insulation, are clamped between upper and lower plates $e'$ and $e^2$, the latter being drawn and held together by means of clamping screws or bolts $e^3$. Each line-bank, as shown in Fig. 49, has its contacts suitably insulated from each other and held in fixed relative positions, the whole being held and clamped together by means of bolts and screws $c^2$ and upper and lower clamping-plates $c^3$ and $c^4$. Preferably the end of each line-bank is provided with a brass covering-plate—such, for example, as the notched plate $c^5$ shown in Figs. 46 and 50—as a provision of this character appears to have a beneficial effect in reducing static action and cross-talk. The private-shaft wiper $c^4$ is single in character, inasmuch as it only engages one contact at a time and is removably secured to the shaft B and suitably insulated therefrom. (See Fig. 47.)

As shown in Fig. 48, each pair of line-shaft wipers comprises an upper and lower switch-arm or movable contact, the two being insulated by interposed insulation and the whole being suitably clamped to the shaft B and insulated therefrom. These shaft-wipers may be of any suitable form or character, but are preferably of the shape and construction shown more clearly in Fig. 44, each wiper comprising a pair of superimposed strips of sheet metal, having their enlarged or middle portions suitably clamped to the shaft and provided at their rear or outer ends with terminals for making solder or other wire connections. The contact end of each wiper ("private" or "line") consists of the slightly-separated end portions of the two superimposed pieces of metal, the same being adapted to receive and engage the upper and lower surfaces of the terminals, either private or line, as the case may be. In this way each line-shaft wiper has an upper member or switch-arm adapted to connect the so-called "vertical line conductor" of the subscriber's line with the corresponding "side" or "line" conductor of the desired trunk-line, and each line-wiper also has a lower member or switch-arm adapted to connect the so-called "rotary line conductor" of the subscriber's line with the corresponding side or line conductor of the said trunk-line, and if the switch is used as a second, third, &c., selector then the opposite sides of one trunk-line are connected, through the medium of the two members of either line-wiper, with corresponding sides of another trunk-line. It will be understood that the relative arrangement of the shaft-wipers is such that each time a line-wiper engages a line-terminal the "private" wiper engages the corresponding contact in the private bank. Preferably the three banks of contacts are removably mounted upon the said rods $a$, and the arrangement is such that they can be readily adjusted thereon, so as to insure the correct or necessary position of each bank-terminal to its allotted shaft-wiper. Furthermore, by making the banks separate and each removable as a unit from the balance of the structure the manufacture and repairing of the switch is greatly facilitated. As shown, the banks are separated from each other and clamped firmly in place by means of split collars like the one shown in Fig. 51. It will be seen that each collar $a^2$ is adapted to fit and slide upon one of the vertical supporting rods or hangers $a$ and is provided with a clamping-screw $a^3$. Furthermore, each collar is provided with an upwardly-extending and hook-shaped lug $a^4$. It will be observed that the upper and lower clamping-plates of the three banks have their end portions provided with openings adapted to receive the rods $a$, it being possible in this way to secure the rods to the frame A, and then insert the lower ends of the rods through the openings in the said plates. The private bank can be first adjusted into place in this manner, and then the upper line-bank C, and finally the lower line-bank D, and as soon as the private bank is adjusted to the desired position it is then clamped and held in place by the application to its lower clamping-plate of two of the rings shown in Fig. 51. The method of applying these rings consists in slipping them upwardly upon the said rods $a$ and then slightly rotating them until the lugs $a^4$ engage the edges of the lower clamping-plate of the bank in the manner shown in Figs. 44 and 52 and as shown in Fig. 2. When thus applied, these hook-shaped lugs $a^4$ reach upwardly and slightly over the end edges of the lower clamping-plate of the bank, and when the screws $a^3$ are then tightened up the bank is locked or clamped firmly in place. A second pair of clamping-rings is then applied in the same manner to the lower clamping-plate of the bank C, as shown in Fig. 2, and the third pair to the lower clamping-plate D. In this way these rings $a^2$ not only separate the banks from each other, but also clamp or firmly lock the same in place upon the vertically-disposed rods $a$. Each bank is adjustable independently of the others, and consequently the correct position of each bank relatively to its allotted wiper is insured. Normally the three wipers on the shaft remain out of use and at points just below the first level of the switch and in the position shown in Fig. 44. In order, therefore, to make connection with the first line-terminal in the first level, the shaft must be given one vertical step and then one rotary step, as will hereinafter more fully appear.

The mechanism or electromagnetically-actuated machinery for operating the switch-contacts thus constructed is as follows: As stated, the frame A is provided with lower laterally-projecting portions $a'$ for supporting the stationary switch-contacts. It is also provided with a lower horizontal portion $a^5$, which is integral with the said portion $a'$ and also with the vertically-disposed back portion $a^6$. A shaft-bearing $a^7$ is secured to the under side of the frame, while a similar bearing $a^8$ is secured to the top or upper portion $a^9$ of the said frame. These bearings may be of suitable character and are adapted to support the shaft B in both its rotary and endwise movements. At its upper end the said shaft is provided with a clock-spring device $b$, preferably of the character shown more clearly in Figs. 22 and 23. As shown, the said device comprises a clock-spring $b'$, having its inner end suitably secured to the stationary hub $b^2$ and its outer end secured to the shell or housing $b^3$. The said shell or housing is secured to the shaft by means of a screw or key $b^4$, while the said hub is rigidly connected with an arm $b^5$, held stationary by means of the so-called "normal post" $b^6$, which is secured to the top of the frame. The tension of the said spring is such as to normally hold the shaft-wipers in the previously-described positions and to return the same to their normal positions when the shaft is released from any position to which it may have been rotated for the purpose of making the desired connection. The arm $b^5$ is provided with a stop $b^7$, adapted to be engaged by the so-called "normal-post" arm $b^8$, the latter being rigidly secured to the shaft B by a clamping-screw or key device $b^9$. Normally the arm $b^8$ engages another downwardly-projecting stop upon the arm $b^5$ just to the right of the normal post $b^6$, so as to keep the shaft-wipers in their normal positions; but should the shaft be rotated to the limit of its movement in such direction the arm $b^8$ will then strike the stop $b^7$. In this way the said lug on the arm $b^5$ immediately to the right of the normal-post arm $b^6$ serves as a stop to limit the rotary return movement of the shaft, while the lug or stop $b^7$ serves to limit the operative rotation of the shaft in the direction necessary for picking out and making connection with the proper trunk-line. It will be understood, of course, that the stop $b^7$ is only engaged by the arm $b^8$ at such time as the shaft may have been caused to rotate to an extent sufficient to carry the shaft-wipers clear across the banks—that is, to the end of any level in which the shaft-wipers happen to be operating. This normal-post arm $b^8$ has a further function, as it is provided with a piece of insulation $b^{10}$, adapted to normally engage the intermediate spring $b^{11}$ of a spring-switch carried by the top of the frame. Consequently the said spring $b^{11}$ is normally in engagement with the lower spring $b^{12}$ and out of engagement with the upper spring or contact $b^{13}$. As soon as the shaft makes one vertical step, however, the spring $b^{11}$ is released, and thereby permitted to break contact with the spring $b^{12}$ and make contact with the spring or switch-contact $b^{13}$, as will hereinafter more fully appear. Between its upper and lower bearings the said shaft is provided with vertical ratchet-teeth $b^{14}$ and with rotary ratchet-teeth $b^{15}$, the latter being arranged below the former. Between the rotary ratchet-teeth $b^{15}$ and the lower shaft-bearing $a^7$ the shaft is provided with a split sleeve $b^{16}$, adapted normally to rest upon the upper surface of the bearing $a^7$ and adapted also to serve as a cam or stop device for the hereinafter-described side switch. The so-called "vertical ratchet-teeth" are preferably ten in number and correspond to the ten previously-described levels of the switch. The rotary ratchet-teeth are sufficient in number to permit the shaft to be given ten rotary steps, it being remembered that each bank-level contains ten operative positions—that is, ten positions for making connection with as many different trunk-lines. As shown more clearly in Figs. 1, 16, 41, 42, and 43, the vertical ratchet-teeth are provided with a vertical and longitudinally-extending channel $b^{17}$. As shown in Figs. 1, 2, 40, 41, and 42, this channel is normally engaged at its upper end by the stationary supporting-dog $b^{18}$, the latter being secured in any suitable manner to the vertical front portion $a^{10}$ of the frame. It will also be seen that this stationary supporting-dog normally engages that portion of the channel or groove $b^{17}$ which is cut in the cylindric collar $b^{19}$, thus preventing rotation of the shaft when the latter is in its normal position. As soon as the shaft is given one vertical step, however, the collar $b^{19}$ is raised to a point where its under surface is at a level with the upper surface of the supporting-dog $b^{18}$, whereby the shaft if rotated after having been thus raised is received by the dog $b^{18}$ and supported in its rotary movements, as shown in Fig. 43. When the shaft is given two vertical steps, the first circular tooth is raised to a level where its under side is flush with the upper side of the supporting-dog $b^{18}$, whereby the shaft, if rotated at such a level, will be received, as in the previous case, by the supporting-dog $b^{18}$ to carry the weight of said shaft during its rotation. In this way and regardless of the level to which the shaft is adjusted or stepped up the supporting-dog $b^{18}$ is always ready to receive the shaft if rotated. Furthermore, the shaft can only move vertically when the stationary supporting or locking dog $b^{18}$ is in engagement with the groove or channel $b^{17}$. Consequently the upward movement of the shaft always takes place before the wipers have been given any rotary movement and the downward or release movement of the shaft always takes place after the wipers have been rotated or swung completely out of engagement with the bank-contacts. Normally the two rigidly-connected locking-dogs $b^{20}$ and $b^{21}$ are out of engagement with the ratchet-teeth, the former being allotted to the vertical ratchet-teeth and the latter to the rotary ratchet-teeth. These two rigidly-connected locking-dogs are mounted to swing about a vertical axis and are provided with an arm $b^{22}$ and a small upwardly-projecting lug $b^{23}$, as shown in Figs. 18, 20, and 21. The double locking-dog device thus provided can be made in any suitable manner and provided with bearings $b^{24}$ affording the said vertical axis. The upper of said bearings preferably consists of an adjustable screw $b^{25}$, whereby any wear or lost motion may be readily taken up. A spring $b^{26}$, having its upper end screw-fastened to the frame, is adapted to bear upon the structure of the two locking-dogs and to yieldingly hold the same in engagement with their respective ratchet-teeth when the switch is in operation. Whenever the shaft is given one vertical step, the locking-dog $b^{20}$ so engages the under side of the first or uppermost ratchet-tooth as to support the shaft in its raised position, as shown in Fig. 19. If the shaft is given a second step, the said dog $b^{20}$ engages the second tooth, and so on. The release-magnet F has its cores secured by a bracket $f$ to the forward vertical portion of the frame, the said magnet being preferably arranged in the space between the vertical portions $a^{10}$ and $a^{11}$ of the frame and the horizontal portions $a^{12}$ and $a^{13}$, and it will be seen that the cores of the said release-magnet are arranged horizontally one above the other. At the top the said frame is provided with ears $a^{14}$, containing pivot-screws adapted to engage the upper end of the armature $f'$, the latter being arranged in operative relation to the poles or free ends of the "release-magnet cores." The said armature is normally held away from the said release-magnet by a flat retracting-spring $f^2$, the same having its upper end secured to the top of the frame by a screw $f^3$ and having its lower end slightly notched and adapted to engage a lug $f^4$, carried at the lower outwardly and upturned end portion of the said armature. A bracket $f^5$ is secured to the frame and provided with an adjustable screw $f^6$, adapted to act as a stop for limiting the outward movement of the said armature. At its lower upturned portion the said armature is provided with a link $f^7$, having its outer or free end formed with an opening $f^8$. Normally the said opening $f^8$ engages the lug $b^{23}$, carried by the rigid structure of the two locking-dogs. Consequently the spring $f^2$ not only keeps the armature $f'$ normally retracted, but also through the medium of the link $f^7$ maintains the two locking-dogs normally out of engagement with their respective ratchet-teeth. When energized in any suitable manner, the said magnet attracts its armature, and thereby pushes the opening $f^8$ into engagement with the projection $b^{23}$, and then when the magnet is deënergized the spring $f^2$ retracts the armature, and thereby pulls the two locking-dogs $b^{21}$ and $b^{22}$ out of engagement with their respective ratchet-teeth. Referring to Figs. 38 to 43, inclusive, it will be seen that the so-called "vertical magnet" G has its upper end suitably secured to the under side of the frame portion $a^{13}$ and occupies a position immediately back of the said release-magnet. The armature $g$ of the said vertical magnet is preferably mounted to vibrate about a horizontal axis, it being provided with adjustable bearings or pivots $g'$. This armature $g$ is provided with an L-shaped lug $g^2$, adapted to reach under the link $f^7$, so that when the said armature is attracted the said link is lifted out of engagement with the previously-described projection $b^{23}$, and in this way the locking-dogs $b^{20}$ and $b^{21}$ are immediately released upon the energizing of the magnet G. In addition the armature $g$ is provided with an arm $g^3$, having its end pivotally connected with a "vertical ratchet-pawl" $g^4$. As shown, this pawl is subject to the tension of a spring $g^5$, which is fastened to the rear end of the pawl at one end and to the arm $g^3$ at its other end. Consequently the normal tendency of the pawl $g^4$ is to engage the vertical ratchet-teeth $b^{14}$. Preferably, however, the armature $g$ is held normally retracted—that is, in the depressed position—by means of a flat spring $g^6$, having one end secured to the under side of the said armature and its other end notched and adapted to engage the T-shaped screw-threaded adjustable stop or member $g^7$. With this arrangement the said T-shaped screw-threaded member $g^7$ can be adjusted for the purpose of varying the tension of the spring $g^6$ in accordance with requirements. Normally the pawl $g^4$ engages the guide $g^8$, which latter is stationary and secured in any suitable manner to the frame A; but when the armature $g$ is attracted the pawl $g^4$ is then forced by the spring $g^5$ into engagement with the vertical ratchet-teeth. In its upward movements the said pawl is limited by the stop or guide $g^9$, which latter is also stationary and, if desired, may be simply a portion of the frame A. When the pawl strikes the stop $g^9$, the shaft is of course then locked against farther upward movement until the pawl is withdrawn and the vertical magnet again energized. (See Fig. 39.) With such construction the alternate attraction and release of the armature $g$ is accompanied by an alternate engagement of the pawl $g^4$ with and disengagement from the vertical ratchet-teeth, resulting in a vertical step-by-step movement of the shaft B. In other words, the shaft is given one vertical step each time the magnet G is energized, and the locking-dog $b^{20}$ promptly engages the vertical ratchet-teeth, and thereby holds the shaft against downward movement while the spring $g^6$ is retracting the armature $g$. Figs. 38, 40, and 41 show the shaft in its normal position; but in Fig. 39 the vertical magnet G is shown energized and the shaft B as having been stepped up to the sixth level.

The rotary step-by-step mechanism is shown more clearly in Figs. 4, 5, and 6. It will be seen that the rotary magnet H is suitably secured to the back of the frame and arranged in a horizontal position between the portions $a^5$ and $a^{12}$ of the frame. The said magnet is provided with an armature $h$, which is pivotally mounted at $h'$, and thus adapted to vibrate about a vertical axis. At its upper portion the said armature is provided with an arm $h^2$, having a pivotal connection with the ratchet-pawl $h^3$, the latter being subject to the tension of a spring $h^4$. This spring, it will be seen, is attached at one end to the rear end of the pawl $h^3$ and at its other end to the arm $h^2$. The screw $h^5$ passes through the frame and is provided with a lock-nut $h^6$, the reduced end portion $h^7$ of this screw being adapted to act as a guide for the rotary pawl $h^3$. A somewhat similar device $h^8$ is employed as a stop for limiting the retraction or back movement of the arm $h^2$ when the magnet H is deënergized. The other guide $h^9$ for this rotary pawl consists, preferably, of a piece of metal pressed or otherwise given the desired shape and adjustably held in place by a screw $h^{10}$ passing through a slot formed therein—that is, adjustably secured to the frame A. It is desirable that this guide $h^9$ be capable of accurate and delicate adjustment, and for this purpose an adjusting-screw $h^{11}$ is provided and arranged in position to engage the body portion of the said guide. As shown, the screw $h^{11}$ is provided with a small flange $h^{12}$, adapted to engage a slot $h^{13}$ in the said guide. With this arrangement the screw $h^{11}$ can be rotated in its threaded socket in the frame and the guide $h^9$ thereby adjusted in a horizontal plane, it being observed that the said guide is provided with a pair of ears or cheeks $h^{14}$, adapted to embrace the portion of the frame upon which it is mounted. A spring $h^{15}$, having one end secured to the armature $h$ and the other end notched and adapted to engage the T-shaped adjusting-piece $h^{16}$, is employed for yieldingly holding the said armature away from the rotary magnet H. The tension of the said spring can be regulated by rotating the T-shaped and threaded adjusting-piece $h^{16}$, the latter being screwed into the frame. In this way the pawl $h^3$ is forced by the guide $h^9$ into engagement with the ratchet-teeth $b^{15}$ each time the magnet H is energized. Furthermore, said stop or guide $h^9$ serves as a means for holding the pawl firmly against the beveled forward surface of the next tooth when the end of the rotary step is reached and for thus positively locking the shaft against further and undue rotary motion until the pawl is withdrawn and the magnet again energized. (See Fig. 6.) As will be seen, the magnet is not deënergized until after the pawl is engaged by the stop $h^9$, so that the rotary magnet continues to attract its armature until after the rotary step is completed. When this magnet is deënergized, the spring $h^{15}$ retracts the armature $h$, and thereby pulls the pawl $h^3$ against the end of the guide $h^7$, which latter then forces the pawl out of engagement with the said ratchet-teeth. Consequently the alternate energizing and deënergizing of this so-called "rotary magnet" H is accompanied by an alternate engagement of the rotary pawl with and disengagement from the said rotary ratchet-teeth, resulting, of course, in a rotary step-by-step movement of the switch-shaft. In addition the armature $h$ is provided with the interrupter-arm $h^{17}$, having its end portion provided with the laterally-projecting lug $h^{18}$, as shown more clearly in Fig. 12. The switch-springs $h^{19}$ and $h^{20}$ are normally in engagement with each other at their ends and are secured in place to the frame by means of screws $h^{21}$ and a bracket $h^{22}$ and screws $h^{23}$. An intermediate spring $h^{24}$ is provided and prevented from contacting with the spring $h^{20}$ by means of insulation $h^{25}$. The upper spring $h^{19}$ has a projection $h^{26}$, which rests upon the intermediate spring $h^{24}$. The lower spring $h^{20}$ has a contact portion $h^{27}$, which is normally in engagement with the spring $h^{19}$. When the magnet H is energized and its armature attracted, the projection $h^{18}$ first strikes the portion $h^{26}$ of the upper spring and in so doing preserves the contact normally existing between this spring and the lower or outer spring $h^{20}$. The movement of the armature continuing, the projection $h^{18}$ then slips off from the portion $h^{26}$ and onto the spring $h^{24}$, thus causing the electrical contact between the two springs to be broken. At this juncture it will be seen, as previously stated, that the circuit through the rotary magnet is not broken until after the rotary motion of the shaft has ceased—that is, not until after the shaft has reached the end of the rotary step, where it is then locked against further movement by the rotary pawl and the stop $h^9$. This is for the reason that the circuit is not broken until after the interrupter-arm slips off from the upper spring and not until after the springs have sprung back against the end of said arm. In other words, the springs $h^{19}$ and $h^{20}$ do not separate until after the spring $h^{24}$ strikes the end of the arm, and consequently not until after the rotary motion of the shaft has ceased, for the rotary motion ceases at the instant the end of the arm slips off from the upper spring, and the energizing-circuit then remains closed for that fraction of an instant during which the spring $h^{24}$ is moving into engagement with the end of the interrupter-arm. When the magnet is deënergized and the armature released, the return movement of the arm $h^{17}$ causes the projection $h^{18}$ to pass underneath the portion $h^{26}$, thus temporarily retaining the separation of the two switch-springs—that is, keeping the two springs separated until the armature is fully restored to its normal position. The armature $h$ is also provided with a finger $h^{28}$, adapted to engage the armature $h^{29}$ of the so-called "private magnet" $h^{30}$. This private magnet is secured to a bracket $h^{31}$, which latter is in turn secured to the frame A by means of screws $h^{32}$. The said armature $h^{29}$ is pivoted at $h^{33}$ to the forward end of the horizontal portion of the said bracket $h^{31}$ and is thereby adapted to vibrate about a horizontal axis. As shown, the armature $h^{29}$ is provided with a forwardly-projecting and horizontally-disposed arm $h^{34}$, said arm having upper and lower flat springs $h^{35}$ and $h^{36}$, suitably secured thereto. It will be observed that the forward ends of these springs are provided with upper and lower ratchet-teeth $h^{37}$ and $h^{38}$, said upper and lower teeth being arranged opposite to each other and the upper teeth slightly out of register with the lower teeth, as shown more clearly in Figs. 7 to 11, inclusive. This arm $h^{34}$ is also provided with a lateral projection which carries a piece of insulation $h^{39}$, adapted to engage between the switch-springs $h^{40}$ and $h^{41}$. These two switch-springs are, together with the third switch-spring $h^{42}$, suitably mounted upon the top of the bracket $h^{31}$, as shown in Figs. 4 and 5. The springs $h^{40}$ and $h^{41}$ are normally in electrical contact with each other, while the third or lower spring $h^{42}$ is normally out of engagement with the spring $h^{41}$, and these three springs, together with the interposed strips of insulation, are secured in place by means of screws $h^{43}$. With this arrangement the energizing of the private magnet will cause the separation of the springs $h^{40}$ and $h^{41}$ and the engagement of the latter with the spring $h^{42}$. Also, as will hereinafter more fully appear, the energizing of the said rotary magnet H will cause the finger $h^{28}$ to engage the armature of the private magnet, and thereby operate the arm $h^{34}$ and the said switch-springs $h^{40}$, $h^{41}$, and $h^{42}$ in substantially the same manner that these parts are operated by the energizing of the said private magnet. Furthermore, the switch-spring $h^{41}$ serves as the means for yieldingly holding the armature $h^{29}$ in its normal position and for retracting the armature to its normal position when the private magnet is deënergized or when the rotary magnet is deënergized.

The so-called "side switch" I is provided with a finger $i$, adapted to extend between the upper and lower springs $h^{35}$ and $h^{36}$ and to normally occupy the position shown in Fig. 4—that is, in engagement with the inner tooth $h^{38}$. The said side switch is pivotally mounted at $i'$ and is thereby adapted to vibrate about a vertical axis. The side switch is at all times subject to the torsional or twisting tension of the spring $i^2$, the latter having its upper end suitably secured to the said side switch and its lower end secured to the key or tension-regulating device $i^3$. This device $i^3$ is provided with a head or thumb piece $i^{17}$, adapted to engage any one of several pairs of notches $i^{18}$, formed in the lower portion of the frame A, as shown in Figs. 34 and 36. With this arrangement the said spring $i^2$ can be twisted or wound up, so to speak, and retained in such position by causing the key or tension-regulating device $i^3$ to engage any one of said pairs of notches, it being observed that the members of each pair of notches are arranged at opposite sides of the hole or opening through which the key or tension-regulating device extends. Consequently the said side switch tends normally to swing or turn about its axis and in a direction calculated to cause the finger $i$ to escape from between the springs $h^{35}$ and $h^{36}$. In fact, the tension of the spring $i^2$ is normally resisted by the inner tooth $h^{38}$, the latter being the one with which the finger $i$ normally engages, and for this reason the said side switch can be given a step-by-step releasing movement, so to speak, by simply allowing its finger $i$ to escape or move one step at a time. This is accomplished when the private magnet is energized or when the rotary magnet is energized, it being seen that the armature $h^{29}$ when attracted causes the finger $i$ to engage the inner tooth $h^{37}$, as shown in Fig. 7. After this and when the private magnet or the rotary magnet is deënergized the release of the armature $h^{29}$ brings the finger $i$ into engagement with the point or top of the inner tooth $h^{38}$, as shown in Fig. 8. In such condition the side switch is then ready to escape to the second position, as shown in Fig. 32, carrying the stop-lug $i^{13}$ against the inner edge $i^{14}$ of the cam $b^{16}$ and the finger $i$ nearly into engagement with the outer tooth $h^{38}$, as shown in Fig. 9. The side switch being thus shifted, energizing-circuits are thereby established through the rotary magnet H, which will cause the shaft to be rotated so that the cam $b^{16}$ is carried out of engagement with the lug or projection $i^{13}$, at which time the finger $i$ falls against the foremost tooth $h^{38}$. The rotated position of the cam $b^{16}$ is shown in Fig. 33. Another vibration of the armature $h^{29}$ will bring the said finger $i$ into engagement with the top or point of the outer tooth $h^{38}$, as shown in Fig. 10. When the armature is again released, the finger $i$ escapes into engagement with the stationary stop X, which latter is integral with the guide $h^9$. In this way the ratchet-teeth carried by the flat flexible springs $h^{35}$ and $h^{36}$ are adapted to operate as a step-by-step device for releasing the side switch from its normal position to second position and then from second position to third position, as will farther on more fully appear. It is obvious that the finger $i$ can be restored to its normal position by any pressure tending to force it inwardly against the beveled edges of the said teeth and between the points of the latter, it being possible to thus restore the side switch to normal position, for the reason that the springs $h^{35}$ and $h^{36}$ are adapted to yield sufficiently to permit such action. At least the spring $h^{36}$ is adapted to flex and bend away from the arm $h^{34}$, as shown in Fig. 8. As stated, either the private magnet or the rotary magnet can effect a depression of the arm $h^{34}$; but in any event the retraction or restoration of the said arm to its normal or elevated position is effected by the switch-spring $h^{41}$. As illustrated, the said side switch is provided with four wipers $i^4$, $i^5$, $i^6$, and $i^7$, as shown in Figs. 31 to 35, inclusive. These movable switch arms or wipers are suitably secured to the portion $i^8$ of the said side switch by means of screws or bolts $i^9$. It will be seen that the said side-switch arms or wipers are suitably insulated from each other and are adapted to swing in unison. Suitably secured to the frame A, preferably by means of a bracket-plate $i^{10}$ and screws $i^{11}$, are a requisite number of stationary contacts $i^{12}$, said contacts being also suitably separated or insulated from each other by strips of insulation. With the arrangement shown these contacts are arranged in four levels of three contacts each, whereby each side-switch wiper is adapted to coöperate with three stationary contacts during the operation of the switching machinery as a whole. In other words, each side-switch wiper has three operative or connective positions, all three wipers being normally in first position and then simultaneously assuming second position and finally third position, and this switching action has an important bearing on the operation and use of the switching machinery as a whole during the time the same is being employed for making connection, as will more fully appear. The first time the side switch is released its movement is limited by reason of the lug $i^{13}$, which is rigid with the said side switch, being brought into engagement with the edge or projection $i^{14}$ of the previously-described cam $b^{16}$, as shown in Fig. 32. As soon as the shaft B rotates this cam is rotated away from the lug $i^{13}$, as shown in Fig. 33, and to such an extent that the final movement of the side switch is limited by the finger $i$ being brought into engagement with the stationary stop X. The movement of the side switch when it is restored to its normal position is limited by the lug or projection $i^{15}$, which is rigid with the side switch and which is adapted to strike the front portion of the frame. As previously stated, the double locking-dog device comprising the two locking-dogs $b^{20}$ and $b^{21}$ is provided with the downwardly-projecting arm $b^{22}$. This arm $b^{22}$ is connected with the side switch, it will be seen, by means of a link $i^{16}$, as shown more clearly in Fig. 37. It will be seen that this link is provided at its end with a notch adapted to engage the lower T-shaped portion of the arm $b^{22}$, whereby the said double locking-dog device can be retracted or disengaged from the ratchet-teeth on the shaft without causing any movement on the part of the side switch; but when the side switch has been shifted to third position and the said double locking-dog device released or attracted it is obvious that the spring $f^2$ then not only retracts the said locking-dogs, but also restores the said side switch to its normal position. Of course when the said double locking-dog device is retracted by the spring $f^2$ in response to the deënergizing of the release-magnet F both the switch-shaft and the side switch are restored to their normal positions, the shaft being then free to rotate to its normal position under the influence of a clock-spring device at its upper end and to then fall to its normal level as soon as the groove or channel $b^{17}$ again registers with the end of the supporting-dog $b^{18}$. In other words, the switch-shaft is simply released and allowed to automatically restore itself, while the side switch is positively restored by the action of the armature-spring $f^2$.

The means for removably connecting the switching machinery thus constructed with the trunk-line extending thereto and with the various relay connections is as follows: A set of jack-springs J is secured to the back of the stationary frame A, these springs being suitably insulated from each other and provided with downwardly-extending terminals $j$, adapted for making the usual solder or other like connections with the different wires and conductors leading to the different magnets and other parts of the switching-machine as a whole. As shown, these springs are nine in number, being arranged in groups of three, as shown in Fig. 24. The rack or support K for the switches is provided with sets of jack-springs L, one set for each selector or other similar switch and each set consisting of as many springs as there are jack-springs in the set attached to the switch. These stationary jack-springs L are, it will be seen, provided with outer bifurcated end portions $l$, adapted to receive the straight outwardly-projecting end portions of the jack-springs on the switch. It will also be seen that these stationary jack-springs are provided at their rear ends with terminals $l'$, adapted for making solder connections with the line and other conductors leading to the switch. In this way the necessary circuit connections can be made by simply inserting the switch in place and without the necessity of soldering together any wires or other conductors. In other words, each switch, whether it be a selector or connector or other similar switch, can be simply inserted in place and removed therefrom without making or breaking any wire or solder connections, the switching-machine as a whole being provided with contacts adapted to engage switch-contacts on the frame for the purpose of completing the necessary circuits.

The relays M, N, O, and P, although not strictly a part of the switching-machine, can be mounted on top of the frame A, as shown in Figs. 1, 2, and 3. These relays are employed for controlling the local circuits of the different magnets involved in the construction of the switching-machine and may be mounted either on the switch structure or on a separate and independent support. Furthermore, the number and arrangement of relays can be changed or varied to suit the conditions of any particular case and according to the character of the system or circuit arrangement in which the switching-machine is employed as a selector or as a connector, as the case may be. The construction and mode of operation of these relays will hereinafter more fully appear.

The switch or switching machine thus constructed can be wired up and employed in various connections and operated in various ways. In Fig. 54, however, we have illustrated one circuit arrangement for the different magnets and switch-contacts, &c., which circuit arrangement may be employed when the switching-machine is used as a selector. In this figure the circuits and switch-contacts are shown diagrammatically, while the step-by-step mechanism or actual operating machinery of the switch is shown more or less in perspective. At this juncture it may be stated that the frame A is desirably cast from non-magnetic material, such as brass, "Franklin" metal, or other suitable similar metal.

In illustrating the circuits of the switching-machine the previously-described devices and parts have been shown more or less diagrammatically and in a simplified manner for convenience of illustration. For example, in this figure no attempt has been made to illustrate the previously-described non-magnetic frame, and the banks C and D have been shown as one bank, while the previously-described wipers $c$ and $d$ have been shown as a single wiper composed of but two contacts, which are insulated from each other. Again, the previously-described flat springs for restoring the armatures and other operative parts have been shown in Fig. 54 as simple coil-springs, and the release-magnet F has been shown as consisting of but a single coil, whereas in the description of the mechanical construction it has been shown and described as comprising two coils. It will be understood, however, that the mechanical construction indicated in Fig. 54 is preferably of the character set forth in the description of the preceding figures, and with such construction and with the circuit arrangement shown the switching-machine is operated as follows: The so-called "vertical line conductor" 1 leads to the "vertical side-switch wiper" $i^6$, which latter normally engages the "side-switch contact" 2. The impulse or impulses transmitted by the subscriber to whom the switching-machine is allotted over the said vertical line conductor traverses a grounded circuit including this line conductor and side-switch wiper, the contact 2, the conductor 3, the "vertical line-relay" M, the conductor 4, the normally closed bridge cut-off contacts 5 and 6, the conductor 7, and the mutually engaging jack-springs of the switch and supporting-rack, and thence to the non-grounded pole of the battery 8. The vertical line-relay M will then close a local circuit through the vertical magnet G as many times as is necessary in order to raise the switch shaft B to the desired level. This local circuit, it will be seen, includes the battery 8, the conductor 9, the mutually engaging jack-springs 10, the relay-contacts 11 and 12, the conductor 13, the normally closed contacts $h^{41}$ and $h^{40}$, conductor 14, the vertical magnet G, conductors 15, 16, and 17 to the jack-springs 18, and thence to the non-grounded pole of the battery. As previously stated, the energizing of the vertical magnet in this way releases the two locking-dogs $b^{20}$ and $b^{21}$, permitting the same to engage their respective ratchet-teeth, and it will be understood that the shaft is raised to the first, second, third, or fourth level, and so on, according to the number of distinct impulses transmitted through the "line-relay" M, and by the latter repeated in the local circuit including the vertical magnet G. After this a single impulse transmitted by the calling subscriber over the rotary line conductor 19 will result in the energizing of the private magnet $h^{30}$ and in its deënergizing, as follows: The grounded line-circuit, including the rotary line conductor 19, also includes the jack-springs 20 and the side-switch-wiper $i^7$, the contact 21, the conductor 22, the "rotary line-relay" N, the conductor 23, the contacts 24, 5, and 6, and the conductor 7 and jack-springs 18, and the final connection leading to the non-grounded pole of the battery. The relay N when thus energized attracts its armature, and thereby closes a local circuit extending from the grounded pole of the battery to the spring 11, thence through the spring or contact 25 to the conductor 26, through the conductor 27 to the private magnet $h^{30}$, through the conductors 28 and 17, and thence through the jack-springs 18 to the non-grounded pole of the battery. The energizing of the private magnet $h^{30}$ and the deënergizing of the same as soon as the flow of current ceases causes the side switch to escape from first to second position in the manner previously described, and it also causes the springs $h^{40}$ and $h^{41}$ to break contact and the spring $h^{41}$ to make contact with spring $h^{42}$. As previously stated, the spring $h^{41}$ is sufficient for restoring the armature $h^{29}$ to its normal position; but in Fig. 54 a spring 29 is shown connected with the arm $h^{34}$, and thus adapted for insuring a restoration of the armature to its normally retracted position. The shifting of the side switch to second position causes the magnet-switching side-switch wiper $i^4$ to engage the contact 30 and to thereby close a circuit extending from the grounded pole of the battery over the conductors 9 and 31 to said contact through the side-switch wiper $i^4$ over the conductor 32 to the rotary magnet H, thence through the previously-described interrupter-springs $h^{19}$ and $h^{20}$, over the conductors 16 and 17 and through the jack-springs 18 to the non-grounded pole of the battery. The energizing of the rotary magnet in this manner causes it to give the shaft one rotary step and at the same time and through the medium of the arm $h^{28}$ causes the armature of the private magnet to depress the arm $h^{34}$, and if the first contact in this particular level of the bank-contacts is not busy the armature of the private magnet will be released and the side switch thereby allowed to move from second to third position. Suppose, however, that the first private-bank contact in the level to which the switch-shaft has been elevated is connected with ground by reason of the line to which it is allotted having already been appropriated for use by some other subscriber. In such case the engagement of the private wiper $e^4$ with the bank-contact characterized at such time by a guarding-potential will close a circuit from ground through said contact and the private wiper over the conductor 33 to the "release-relay" P, over the conductor 34 to the side-switch wiper $i^5$, through contact 35, over the conductor 27 to the private magnet $h^{30}$, and thence over the conductors 28 and 17 to the non-grounded pole of the battery. In this circuit the release-relay P, as shown, is included; but being in series with the private magnet $h^{30}$ and the latter being of comparatively high resistance, usually of about three hundred and fifty or four hundred ohms, the magnetism developed at the relay P by the low current passing at the time is insufficient to attract the armature thereof, and thus the said relay remains inactive; but the energizing of the private magnet $h^{30}$ tends to keep its armature attracted, and thereby prevents the side switch from escaping from second to third position. In other words, the rotary magnet in attracting its armature gives the shaft one rotary step and at the same time puts the mechanism of the side switch in readiness to release the side switch from second to third position; but if the first rotary step thus given the shaft results in the closing of a circuit through the private-shaft wiper and through the private magnet, as stated, the said private magnet will be thereby energized and will prevent the side switch from opening the circuit of the rotary magnet. In this way the rotary magnet will continue to rotate the shaft until the private wiper $e^4$ encounters a non-busy contact—that is, a private-bank contact corresponding to an idle trunk-line. As soon as this occurs the circuit from ground through the private wiper and the private magnet is broken and the side switch thereby allowed to escape to third position, causing the rotary magnet to cease operating. Obviously the vertical movement of the switch-shaft causes the normal-post arm to release the spring $b^{11}$ from engagement with the spring $b^{12}$ and permits the said spring to move into engagement with the upper spring or contact $b^{13}$. This of course opens the circuit at this point through the bridge-cut-off relay O and closes a circuit from the "private normal" 36 through the jack-springs 37 and the conductor 38 to the said intermediate spring $b^{11}$, through the contact $b^{13}$, through conductors 39 and 40 to the jack-springs 10, and thence to ground—that is, to the grounded pole of the battery. In this way the private normal 36, which is connected with all "connector-terminals" corresponding to the calling subscriber's line, is connected with the grounded pole of the battery and a guarding-potential thereby established at all of said terminals. It will also be seen that the private wiper $e^4$, as soon as it rests on a non-busy contact, establishes a guarding-potential at all multiples of such contact. This is for the reason that when the side switch is thrown to third position a circuit is established from the grounded pole of the battery over the conductors 9, 40, 31, contact 41, side-switch arm $i^5$, conductor 34, relay P, conductor 42, and private wiper $e^4$ to the contact which it is in engagement with, and thence through the connections to all multiples of such contact. In this way the operation of the selector to a connective position—that is, to a position where its shaft-wipers make connection with a non-busy trunk-line—is accompanied by the setting up of a guarding-potential at all terminals connected with the calling-subscriber's line and also at all multiples of the trunk-line selected, and consequently both lines are thus protected against seizure by other parties. It will be understood that one hundred, or substantially one hundred, trunk-lines extend from the one hundred line-terminals in the two line-banks of the switch, each terminal being multipled with all other terminals connected with the same trunk-line in other selectors. In a similar way all private-bank contacts allotted to a certain trunk-line in different selectors are multipled together for the purpose described. When the side switch is thrown to third position, the "side-switch line-wipers" $i^6$ and $i^7$ engage the contacts 43 and 44, which latter are connected, respectively, with the vertical and rotary line-wipers 45 and 46, or with two "vertical line-wipers" and two "rotary line-wipers," if the construction is of the character described in connection with the previous figures of the drawings. It will be seen, however, that by the provision of the contacts 47 and 48, which are connected respectively, with the contacts 2 and 21, the subscriber's line is not electrically connected with the line-wipers until the side switch shifts to third position. The shifting of the side switch from second to third position has a further function in this respect, that it automatically cuts off the bridge normally existing across the calling-subscriber's line and containing the two line-relays M and N. With this arrangement the normally bridged coils of the line-relays are cut off or opened up as soon as the side switch shifts from second to third position, thus removing a bridge which might, if left across the circuit during subsequent operations, interfere to some extent with the desired results and efficiency of the system. After the switch has been brought to a condition of rest at the position necessary for making the desired connection and after the subscribers have finished talking, for example, it can then be released by energizing the release-magnet F. Any suitable arrangement can be employed for energizing this release-magnet F. For example, a simultaneous energizing of the two relays M and N will, of course, result in the energizing of the private magnet $h^{30}$ in the manner already described. In this case, however, the energizing of the private magnet separates the springs $h^{40}$ and $h^{41}$, thereby opening the circuit of the vertical magnet G, and thus preventing the latter from actuating the vertical step-by-step mechanism. In addition the energizing of the private-magnet closes contact between the springs $h^{41}$ and $h^{42}$, and thus brings about the closure of a local circuit extending from the non-grounded pole of the battery to the release-magnet F, thence over the conductors 49 and 50, through the springs $h^{42}$ and $h^{41}$, over the conductor 51, through the spring 12, through the spring 11, to the jack-springs 10, and thence over the conductor 9 to the grounded pole of the battery. It will be seen that the energizing of the line-relays in this manner and for this purpose is possible when the side switch is in second position and in case it is desired to release the switch before the side switch has moved to third position. After the switching-machine has made the desired connection and the subscribers have finished their conversation the release-magnet F can then have its local circuit closed by means of the release-relay P. It will be readily understood that any suitable circuit arrangement can be employed for energizing the release-relay P, and when this release-relay is energized its armature closes the normally separated contacts 52 and 53, thereby completing a local circuit from the non-grounded pole of the battery over the conductors 17 and 16 to the release-magnet F, thence over conductors 49 and 54, through the springs 52 and 53, and thence over the conductor 55 to the jack-springs 10 and over the conductor 9 to the grounded pole of the battery. In this way the release-magnet F has two local energizing-circuits, one controlled by the switch-springs of the private magnet and of the line-relays and the other controlled simply at one point by the switch-springs of the release-relay P. The finger $h^{28}$ of the "rotary-magnet armature" $h$ serves to prevent the side switch from shifting to third position before the rotary motion of the shaft is completed, as previously explained.

As previously stated, the circuits can be varied or changed according to the particular use to which the switching-machine is to be applied, it being possible to employ the mechanical construction shown without any or at least with only very slight changes for various purposes and in combination with various relay and circuit arrangements.

As a matter of special improvement it will be seen that the flat springs for retracting the so-called "vertical" and "rotary" armatures are provided with notches which engage the transverse end portions of the T-shaped tension-regulating screws $g^7$ and $h^{16}$. In this way each spring serves not only to retract or restore its allotted armature, but also to lock its allotted tension-regulating screw against turning. The jar and vibration incident to the continual use of the machine might have a tendency to loosen these screws or tension-regulating devices; but this tendency is counteracted by using the ends of the said springs for locking the screws against turning. Consequently these screws or tension-regulating devices cannot be turned or adjusted until after the ends of the springs have been forcibly disengaged from the transverse heads or end portions of the screws.

It will be understood, of course, that in this application we have claimed only those novel features and combinations which constitute our joint invention, that while we have shown and described a selector our invention is obviously capable of more or less application and use in connectors and other kinds of telephone switching-machines, and that our joint application of even date herewith is, therefore, more or less subordinate to this application.

What we claim as our invention is—

1. An automatic switching-machine for telephone systems, comprising a cast frame of non-magnetic metal, a rotatable and endwise-movable switch-shaft supported in bearings on said frame, wipers on said shaft, bank-contacts adapted to be engaged by said wipers, electromagnetically-actuated step-by-step mechanism for giving the shaft an endwise step-by-step movement, similarly-actuated mechanism for giving the shaft a rotary step-by-step motion, locking-dogs, a "release-magnet" for operating said locking-dogs, a "side switch," a "private magnet" for operating said "side switch," and spring means for restoring the shaft to its normal position when released from an operative position, said frame being formed with lower portions $a'$ for supporting the said bank-contacts, and with horizontal portions $a^5$, $a^{12}$, $a^{13}$, and with vertical front and rear portions $a^{10}$, $a^6$, the electromagnet for actuating the shaft endwise being mounted upon the portion $a^{13}$ of the frame, the said release-magnet being mounted upon the said vertical frame portion $a^{10}$, said side switch having contacts secured by a bracket $i^{10}$ to the horizontal frame portion $a^5$, the horizontal frame portion $a^{12}$ connecting the said front and rear vertical portions $a^{10}$ and $a^6$, and the said private magnet and electromagnet for rotating the shaft being secured at their rear ends to the said vertical frame portion $a^6$, substantially as shown and described.

2. An automatic switching-machine for telephone systems, comprising a rotatable and endwise-movable switch-shaft, switch-contacts adapted to be operated by said shaft, a ratchet device for giving the shaft an endwise step-by-step motion, an electromagnet for actuating said ratchet device, another ratchet device for giving the shaft a step-by-step rotary motion, a second magnet for actuating said last-mentioned ratchet device, each magnet being provided with a vibratory armature, and also with a flat adjustable spring for keeping the armature normally retracted, and a tension-regulating member for each spring, each tension-regulating member consisting of a T-shaped piece having its head adapted to engage the end of its allotted spring and having its stem portion threaded and suitably supported in a screw-threaded socket, whereby the rotation of either tension-regulating member in its threaded socket will change or vary the tension of its allotted armature-spring and each spring having its end provided with means for locking its allotted tension-regulating device against turning.

3. An automatic switching-machine for telephone systems, comprising an endwise-movable switch-shaft, switch-contacts adapted to be operated by said shaft, a ratchet device for giving said shaft a step-by-step endwise movement, an armature for actuating said step-by-step device, an electromagnet for actuating said armature, a flat spring having one end secured to the said armature and its other end notched, the axes of the said shaft and magnet being parallel, and a tension-regulating member having a head adapted to lockingly engage the notch in the end of said spring, so as to prevent said member from turning, and the member having also a threaded stem suitably supported in a threaded socket, said spring being arranged to engage the outer surface of said head and thereby tending to keep the armature normally retracted, and whereby the tension of said spring may be changed or varied by rotating said tension-regulating member and thereby causing the latter to move either way in a direction parallel with the shaft and magnet.

4. An automatic switching-machine for telephone systems, comprising a rotatable switch-shaft, switch-contacts operated by said shaft, a ratchet device for giving said shaft a step-by-step rotary motion, an armature for actuating said ratchet device, an electromagnet for actuating said armature, the said shaft and magnet being at right angles to each other, a flat spring having one end secured to said armature and its other end notched, a tension-regulating member having a head adapted to lockingly engage said notch, so as to prevent said member from turning, and the member having also a threaded stem suitably supported in a threaded socket, said spring thereby tending to keep the said armature normally retracted, and whereby the tension of said spring may be changed or varied by rotating said tension-regulating member and thereby causing the latter to move either way in a direction at right angles to both the magnet and the shaft.

5. An automatic switching-machine for telephone systems, comprising an electromagnet, an armature for said magnet, a flat spring having one end portion secured to said armature and the other end notched, and a T-shaped tension-regulating member having a head adapted to engage said notch, so as to prevent said member from turning, and having a threaded stem suitably supported in a threaded socket, the said spring thereby being adapted to keep the said armature normally retracted, whereby the tension of said spring may be changed or varied by rotating said tension-regulating member and thereby causing the latter to move either way in a direction parallel with its threaded stem.

6. An automatic switching-machine for telephone systems, comprising a rotatable and endwise-movable switch-shaft, switch-contacts operated by said shaft, "vertical ratchet-teeth" on said shaft, "rotary ratchet-teeth" on said shaft, electromagnetically-actuated "vertical" and "rotary" pawls for respectively engaging the "vertical" and "rotary" ratchet-teeth, a pair of locking-dogs rigidly connected together and held normally out of engagement with the said "vertical" and "rotary" ratchet-teeth, means whereby the actuation of the "vertical pawl" automatically releases said dogs, and a flat spring having its upper end secured in place by a screw and its lower end slidingly disposed upon the outer surface of the locking-dog which engages the "vertical ratchet-teeth," whereby both dogs are forced into engagement with their respective ratchet-teeth when the same are automatically released as stated.

7. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a "rotary magnet," an armature for said magnet, a "rotary pawl" carried by said armature and adapted to engage said teeth, and a pair of guides for directing said pawl into and out of engagement with said teeth, together with a spring carried by the said armature and pawl and tending to keep the latter pressed against the end of one guide, the guide for throwing the pawl out of engagement with the teeth and subject to the tension of said spring consisting of an adjustable screw having its end adapted to engage the said pawl, and having its screw-threaded body portion suitably adjustably supported and locked in place by a lock-nut.

8. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a "rotary magnet," an armature for said magnet, a "rotary pawl" carried by said armature and adapted to engage said teeth, and a pair of guides for directing said pawl into and out of engagement with said teeth, the guide for forcing the pawl into engagement with the teeth consisting of a plate having a lug adapted to engage the said pawl and thereby positively stop the rotation of the shaft, and having a rotatable adjusting-screw by which it can be adjusted relatively to the pawl and shaft.

9. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a "rotary magnet," an armature for said magnet, a "rotary pawl" carried by said armature and adapted to engage said teeth, and a pair of guides directing said pawl into and out of engagement with said teeth, the guide for forcing the pawl into engagement with the teeth consisting of a slotted plate adjustably held in place by a clamping-screw passing through its slot into the support on which the plate is mounted, said plate being provided with a rotatable adjusting-screw having a flange adapted to suitably engage the plate for the purpose of changing the relation of the guide to the pawl when the screw is rotated.

10. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a magnet, an armature for said magnet, a pawl carried by said armature and adapted to engage said teeth, guides for directing said pawl into and out of engagement with the teeth, and a "side switch," the guide for forcing the pawl into engagement with the said teeth consisting of an adjustably-mounted plate having a lug adapted to engage the said pawl, and also having another lug adapted to act as a stop for limiting the final movement of the said "side switch," together with means for adjusting said plate.

11. An automatic switching-machine for telephone systems, comprising a rotatable and endwise-movable switch-shaft, electromagnetically-actuated devices for giving said shaft a step-by-step vertical movement, and also a step-by-step rotary motion, wipers on said shaft, and a plurality of banks of contacts arranged to be engaged by said wipers, said banks being mounted on supporting-rods and separated from each other and clamped in place by split rings applied to said rods and each provided with a lug adapted to engage and hold a portion of one of the said banks.

12. An automatic switching-machine for telephone systems, comprising a pair of rods, a bank of contacts mounted on said rods, and a pair of split rings or collars $a^2$ applied to said rods and each provided with a lug $a^4$ adapted to engage and hold the bottom portion of said bank, together with a switch-shaft provided with means for coöperating with said bank of contacts in establishing any one of a number of possible connections, and means for operating the said shaft.

13. An automatic switching-machine for telephone systems, comprising a frame of non-magnetic metal, a pair of rods having their upper ends secured to the lower portion of said frame, three banks of contacts strung on said rods and arranged one above the other, the upper bank being the so-called "private bank," and the other two banks containing contacts for closing the "line-circuits," together with a switch-shaft provided with wipers adapted to coöperate with said banks of contacts, means for operating said shaft, and split collars applied to said rods and arranged to support and separate the banks from each other, each collar being provided with means for engaging and holding the bottom portion of one of the banks, whereby the said banks can be separately adjusted upon said rods.

14. An automatic switching-machine for telephone systems, comprising a plurality of banks of contacts, adjustable separating and holding devices between said banks, together with switch-arms adapted to coöperate with said contacts in making connections, each bank being held in place and adjustable independently of the others.

15. An automatic switching-machine for telephone systems, comprising a rotatable and endwise-movable switch-shaft, switch-contacts operated by said shaft, a "side switch" and means for operating the same, "rotary ratchet-teeth" on the shaft, an electromagnetically-actuated pawl for engaging said "rotary teeth," ratchet mechanism for giving the shaft a vertical step-by-step movement, and an adjustably-mounted member having one portion adapted to act as a stop for limiting the movement of said "side switch," and having another portion adapted to act as a guide for the said pawl.

16. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a "rotary magnet," an armature for said magnet, a "rotary pawl" carried by said armature and adapted to engage said teeth, and a pair of guides for directing said pawl into and out of engagement with said teeth, the guide for forcing the pawl into engagement with the teeth consisting of a slotted plate adjustably held in place by a clamping-screw passing through its slot into the support on which the plate is mounted, said plate being provided with a rotatable adjusting-screw having a flange adapted to suitably engage the plate for the purpose of changing the relation of the guide to the pawl when the screw is rotated, the said switching-machine comprising also a pair of "line-relays," and means whereby the relays may be employed by a calling subscriber for controlling the operation of the said machine.

17. An automatic switching-machine for telephone systems, comprising a rotatable and endwise-movable switch-shaft, switch-contacts operated by said shaft, means for giving the shaft an endwise step-by-step movement, "rotary ratchet-teeth" on the shaft, a magnet, an armature for said magnet, a pawl carried by said armature and adapted to engage said teeth, guides for directing said pawl into and out of engagement with the teeth, and a "side switch," the guide for forcing the pawl into engagement with the said teeth consisting of an adjustably-mounted plate having a lug adapted to engage the said pawl, and also having another lug adapted to act as a stop for limiting the final movement of the said "side switch," together with means for adjusting said plate, the said switching-machine having also a line-circuit and a pair of bridged "line-relays" and means whereby the same may be employed by a calling subscriber for controlling the operation of the said machine.

18. An automatic switching-machine for telephone systems, comprising a rotatable and endwise-movable switch-shaft, electromagnetically-actuated devices for giving said shaft a step-by-step vertical movement, and also a step-by-step rotary motion, wipers on said shaft, and a plurality of banks of contacts arranged to be engaged by said wipers, said banks being mounted on supporting-rods and separated from each other and clamped in place by split rings applied to said rods and each provided with a lug adapted to engage and hold a portion of one of the said banks, the said switching-machine comprising also a pair of "line-relays," and means whereby the relays may be employed by a calling subscriber for controlling the operation of the said machine.

19. An automatic switching-machine for telephone systems, comprising a pair of rods, a bank of contacts mounted on said rods, and a pair of split rings or collars $a^2$ applied to said rods and each provided with a lug $a^4$ adapted to engage and hold the bottom portion of said bank, together with a switch-shaft provided with means for coöperating with said bank of contacts in establishing any one of a number of possible connections, and means for operating the said shaft, the said switching-machine comprising also a pair of "line-relays," and means whereby the relays may be employed by a calling subscriber for controlling the operation of the said machine.

20. An automatic switching-machine for telephone systems, comprising a frame of non-magnetic metal, a pair of rods having their upper ends secured to the lower portion of said frame, three banks of contacts strung on said rods and arranged one above the other, the upper bank being the so-called "private bank," and the other two banks containing contacts for closing the "line-circuits," together with a switch-shaft provided with wipers adapted to coöperate with said banks of contacts, means for operating said shaft, and split collars applied to said rods and arranged to support and separate the banks from each other, each collar being provided with means for engaging and holding the bottom portion of one of the banks, whereby the said bank can be separately adjusted upon said rods, the said switching-machine comprising also a pair of "line-relays," and means whereby the relays may be employed by a calling subscriber for controlling the operation of the said machine.

21. An automatic switching-machine for telephone systems, comprising a rotatable and endwise-movable switch-shaft, switch-contacts operated by said shaft, a "side switch" and means for operating the same, "rotary ratchet-teeth" on the shaft, an electromagnetically-actuated pawl for engaging said "rotary teeth," ratchet mechanism for giving the shaft a vertical step-by-step movement, and an adjustably-mounted member having one portion adapted to act as a stop for limiting the movement of said "side switch," and having another portion adapted to act as a guide for the said pawl, the said switching-machine comprising also a pair of "line-relays," and means whereby the relays may be employed by a calling subscriber for controlling the operation of the said machine.

22. An automatic switching-machine for telephone systems, comprising a rotatable and endwise-movable switch-shaft, switch-contacts operated by said shaft, a "side switch" and means for operating the same, "rotary ratchet-teeth" on the shaft, an electromagnetically-actuated pawl for engaging said "rotary teeth," ratchet mechanism for giving the shaft a vertical step-by-step movement, and an adjustably-mounted member having one portion adapted to act as a stop for limiting the movement of said "side switch," and having another portion adapted to act as a guide for the said pawl, said switching-machine comprising also a "release-magnet" and means whereby its energization and deënergization effects a release and restoration of the machine to normal position.

Signed by us at Chicago, Cook county, Illinois, this 7th day of April, 1905.

ALEXANDER E. KEITH.
JOHN ERICKSON.
CHARLES J. ERICKSON

Witnesses:
W. LEE CAMPBELL,
R. C. GIFFORD.

---

It is hereby certified that in Letters Patent No. 815,321, granted March 13, 1906, upon the application of Alexander E. Keith, John Erickson, and Charles J. Erickson, of Chicago, Illinois, for an improvement in "Automatic Telephone Selector-Switches," errors appear in the printed specification requiring correction, as follows: In lines 29, 33–34, 36, and 37–38, page 13, the words "application" should read *patent;* and that the said Letters Patent should be read with these corrections therein that the same may conform to the record of the case in the Patent Office.

Signed and sealed this 10th day of April, A. D., 1906.

[SEAL.]

F. I. ALLEN,
*Commissioner of Patents.*